US011632765B2

(12) United States Patent
Golkar (10) Patent No.: US 11,632,765 B2
(45) Date of Patent: Apr. 18, 2023

(54) UPLINK INTERFERENCE MANAGEMENT FOR WIRELESS NETWORKS

(71) Applicant: AirHop Communications, Inc., San Diego, CA (US)

(72) Inventor: Bijan Golkar, San Diego, CA (US)

(73) Assignee: AirHop Communication, Inc., San Diego, CA (US)

( * ) Notice: Subject to any disclaimer, the term of this patent is extended or adjusted under 35 U.S.C. 154(b) by 202 days.

(21) Appl. No.: 17/119,994

(22) Filed: Dec. 11, 2020

(65) Prior Publication Data
US 2022/0030597 A1 Jan. 27, 2022

Related U.S. Application Data

(60) Provisional application No. 63/054,347, filed on Jul. 21, 2020.

(51) Int. Cl.
H04W 72/08 (2009.01)
H04W 72/0453 (2023.01)
H04B 17/318 (2015.01)

(52) U.S. Cl.
CPC ........ H04W 72/082 (2013.01); H04B 17/318 (2015.01); H04W 72/0453 (2013.01)

(58) Field of Classification Search
CPC ........... H04W 72/082; H04W 72/0453; H04W 36/30; H04W 24/02; H04W 16/02; H04W 16/10; H04W 36/20; H04B 17/318; H04B 17/24; H04B 17/345; H04B 17/382; H04L 5/0062
See application file for complete search history.

(56) References Cited

U.S. PATENT DOCUMENTS

| 6,157,668 A | 12/2000 | Gilhousen et al. |
| 6,360,098 B1 | 3/2002 | Ganesh et al. |
| 8,712,461 B2 | 4/2014 | Yavuz et al. |
| 2005/0070285 A1* | 3/2005 | Goransson ............ H04W 36/30 455/438 |
| 2010/0069063 A1* | 3/2010 | Osterling .............. H04W 36/20 455/434 |
| 2010/0105406 A1* | 4/2010 | Luo ....................... H04W 16/02 455/452.2 |

(Continued)

FOREIGN PATENT DOCUMENTS

WO 2008127184 A2 10/2008

OTHER PUBLICATIONS

Amijiroo et al., Neighbor Cell Relation List and Physical Cell Identity Self-Organization in LTE.

(Continued)

*Primary Examiner* — Vinncelas Louis
(74) *Attorney, Agent, or Firm* — Wang Hardoon, P.C.

(57) ABSTRACT

Techniques for uplink interference management for wireless networks are disclosed. In some embodiments, a system, a process, and/or a computer program product for inter-cell interference management for wireless networks (e.g., heterogeneous cellular networks) includes determining a plurality of strongest neighbor cells of a cell on a wireless network based on a plurality of measurement reports; and allocating a distinct frequency reuse pattern selected from a plurality of predetermined frequency reuse patterns to each cell for uplink cellular communication to facilitate inter-cell interference management.

21 Claims, 9 Drawing Sheets

(56) References Cited

U.S. PATENT DOCUMENTS

| | | |
|---|---|---|
| 2010/0234028 A1 | 9/2010 | Narasimha et al. |
| 2010/0240371 A1 | 9/2010 | Cook et al. |
| 2012/0028664 A1 | 2/2012 | Zhang et al. |
| 2012/0122503 A1 | 5/2012 | Ma et al. |
| 2012/0157108 A1 | 6/2012 | Boudreau et al. |
| 2014/0112310 A1 | 4/2014 | Teyeb et al. |
| 2014/0213259 A1 | 7/2014 | Teyeb et al. |
| 2015/0043432 A1 | 2/2015 | Zou et al. |
| 2015/0133129 A1* | 5/2015 | Chiang ................ H04W 16/10 455/447 |
| 2015/0288475 A1 | 10/2015 | Tabet et al. |
| 2015/0312911 A1* | 10/2015 | Maciel ................ H04W 24/02 370/329 |
| 2016/0295439 A1 | 10/2016 | Yang et al. |
| 2017/0230836 A1 | 8/2017 | Hejazi et al. |
| 2021/0409095 A1* | 12/2021 | Zhang ................ H04L 5/0062 |

OTHER PUBLICATIONS

Lopez-Perez et al., Enhanced Inter-Cell Interference Coordination Challenges in Heterogeneous Networks.
Pauli et al., Heterogeneous LTE Networks and Inter-Cell Interference Coordination.

* cited by examiner

FIG. 1

Possible Frequency Reuse Patterns Table

| System bandwidth (MHz) | System bandwidth (# of PRBs) | Possible FH starting positions (PRB index) |
|---|---|---|
| 1.4 | 6 | 1,3,5 |
| 3 | 15 | 1,6,11 |
| 5 | 25 | 1,9,17 |
| 10 | 50 | 1,18,35 |
| 15 | 75 | 1,26,51 |
| 20 | 100 | 1,34,67 |

UPLINK INTERFERENCE MANAGEMENT FOR WIRELESS NETWORKS

PRIORITY AND RELATED APPLICATIONS

This application claims the benefit of priority to U.S. Provisional Patent Application Ser. No. 63/054,347 filed Jul. 21, 2020 and entitled "UPLINK INTERFERENCE MANAGEMENT FOR WIRELESS NETWORKS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the fields of interference management and wireless networking. Specifically, the present disclosure is directed to hardware, software, and/or firmware implementations of Uplink Interference Management (ULIM).

DESCRIPTION OF RELATED TECHNOLOGY

A wireless communication network may support multiple Radio Access Technologies (RAT). Within each technology, a wireless network operator typically deploys macrocells and increasingly small cells (e.g., microcells, picocells, and femtocells, etc.) as well as Wi-Fi access points.

In such a heterogeneous cellular network, mobile wireless devices communicate with a mixture of large and small base stations (e.g. macrocells, microcells, picocells, and femtocells). The transmission to/from these base stations (e.g., cells), such as macrocells, microcells, picocells, and/or femtocells, can create inter-cell interference. Over the past couple of decades, interference induced by the transmission from base stations to mobile wireless devices, often referred to as the downlink direction, has been extensively studied.

SUMMARY

The present disclosure describes, inter alia, systems, methods, and apparatus for Uplink Interference Management (ULIM) within wireless networks.

In one aspect, methods and apparatus for performing Uplink Interference Management (ULIM) are disclosed. One exemplary method includes: collecting a plurality of downlink signal quality measurements from a corresponding plurality of user equipment; identifying a plurality of neighboring cells based on the plurality of downlink signal quality measurements; allocating a contiguous frequency resource for uplink signaling; and assigning the contiguous frequency resource to the corresponding plurality of user equipment.

In another aspect, methods and apparatus for resource allocation useful in conjunction with Uplink Interference Management (ULIM) are disclosed. One exemplary apparatus includes: a transmitter configured to transmit Orthogonal Frequency Division Multiple Access (OFDMA) signals; a receiver configured to receive Single-Carrier Frequency Division Multiple Access (SC-FDMA) signaling; a processor; and a non-transitory computer readable medium. In one exemplary embodiment, the non-transitory computer readable medium includes one or more instructions which when executed by the processor, causes the cellular network apparatus to: set a contiguous frequency resource allocation for the receiver from a first number of predetermined frequency reuse patterns based on a ranked plurality of neighboring cells having a second number; and communicate the contiguous frequency resource allocation to a plurality of user equipment.

In another aspect, methods and apparatus for ranking interfering cells useful in conjunction with Uplink Interference Management (ULIM) are disclosed. One exemplary apparatus includes: a processor in communication with at least one cell station; and a non-transitory computer readable medium comprising one or more instructions which when executed by the processor, causes the apparatus to: rank a first number of interfering neighboring cells from a plurality of neighboring cells based on downlink signaling; generate a second number of contiguous frequency reuse patterns for uplink signaling; and provide the second number of contiguous frequency reuse patterns to the plurality of neighboring cells.

Other features and advantages of the present disclosure will immediately be recognized by persons of ordinary skill in the art with reference to the attached drawings and detailed description of exemplary embodiments as given below.

All Figures AirHop Communications, Inc.© 2016-2020. All rights reserved.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments are defined by the appended claims and their equivalents.

It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein, given the contents of the present disclosure.

Various operations may be described as multiple discrete actions or operations in turn, in a manner that is most helpful in understanding the claimed subject matter. However, the order of description should not be construed as to imply that these operations are necessarily order dependent. Various additional operations may be performed and/or operations may be omitted in alternative embodiments.

Various aspects of the present disclosure may be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. These implementations may be broadly referred to as "techniques". Unless stated otherwise, a component (such as a processor or a memory) described as being configured to perform a task may be implemented as a general component that is temporarily configured to perform the task at a given time (e.g., software, firmware) or a specific component that is manufactured to perform the task (e.g., hardware). As used herein, the term "processor" refers to one or more devices, circuits, and/or processing cores configured to process data, such as computer program instructions.

A detailed description of one or more embodiments is provided below along with accompanying figures that illustrate the principles described herein. The scope of the present disclosure is limited only by the claims and may encompass numerous alternatives, modifications and equivalents. Numerous specific details are set forth in the following description in order to provide a thorough understanding of the principles described herein. These details are purely illustrative and do not limit the scope of the claimed inventions.

It will be apparent to those skilled in the art that various modifications and variations can be made without departing from the spirit or scope of the disclosure. Thus, the present disclosure covers the modifications and variations of the embodiments disclosed above, provided that the modifications and variations fall within the scope of any claims and their equivalents.

Overview of Interference Management within Wireless Networks

In a wireless network, multiple Radio Access Technologies (RATs) can be deployed (e.g., LTE, UMTS, Wi-Fi, etc.). Within each technology, the wireless network operator can deploy base stations (e.g., also referred to as cells in cellular communication technologies, and in some wireless communication technologies, such as Wi-Fi, referred to as access points) to provide wireless access to users.

Within each Radio Access Technology (RAT), the wireless network operator deploys macrocells as well as, increasingly, small cells (e.g., microcells, picocells, femtocells, etc.), operating on multiple frequencies. In addition, co-channel deployments are becoming increasingly popular not only within one technology but also across multiple RATs (e.g., Wi-Fi and LTE in the un-licensed spectrum).

In general, mobile wireless devices and their respective transmission technologies are subject to certain limitations. More specifically, the battery life in such devices (e.g., mobile devices, such as mobile/cellular phones) is relatively limited, which in turn delineates a need for an efficient transmission technology. Such limitations on mobile devices translate into constraints in the design of their respective transmission technologies, which in turn impose constraints on possible inter-cell interference management techniques.

As an example, in the Long Term Evolution (LTE) air interface technology, due to limitations on the size and the battery life of User Equipment (UEs), the LTE uplink transmission technology is different from that of the LTE downlink transmission technology. In general, high signal 'peakiness' results in low transmission efficiency, which can result in a small coverage area and potentially drain the battery of a UE device. High signal 'peakiness,' which can be quantified by Peak to Average Power Ratio (PAPR), is often observed in downlink Orthogonal Frequency Division Multiple Access (OFDMA) signals. This is typically addressed by using more expensive, larger power amplifiers at the base stations.

In order to improve transmission efficiency on the UE side, a different transmission technology, namely Single-Carrier Frequency Division Multiple Access (SC-FDMA), has been adopted by the LTE uplink air interface technology. With a lower PAPR, SC-FDMA requires all frequency resource blocks assigned to a given UE in a given time slot to be contiguous (in contrast, OFDMA can flexibly support discontinuous resource allocations).

As similarly discussed above, the increasing rise of uplink data traffic together with the specific limitations on the uplink transmission technology makes effective solutions for uplink inter-cell interference management an important consideration for successful network deployment, operation, and maintenance.

Accordingly, various techniques for uplink inter-cell interference management for wireless networks are disclosed. In some embodiments, UpLink Interference Management (ULIM) for wireless networks is disclosed. In an example implementation, ULIM is an uplink interference management technique that can be performed for heterogeneous cellular networks. For example, the disclosed ULIM techniques can reduce inter-cell interference in the uplink direction without unnecessary reduction in the available spectrum at each cell, as will be further described below.

In some embodiments, a system, a process, and/or a computer program product for inter-cell interference management for wireless networks includes determining the strongest neighbor cells of a cell on a wireless network based on a plurality of measurement reports (e.g., received measurement reports); and allocating a distinct frequency reuse pattern selected from a set of predetermined frequency reuse patterns to the cell.

In some embodiments, a system, a process, and/or a computer program product for inter-cell interference management for wireless networks includes determining a set of frequency reuse patterns; and allocating a distinct frequency reuse pattern selected from the set of frequency reuse patterns to each cell.

These and other techniques for uplink interference management for wireless networks will be further described below.

Exemplary Embodiments for Performing Uplink Interference Management (ULIM)

Figure 1:
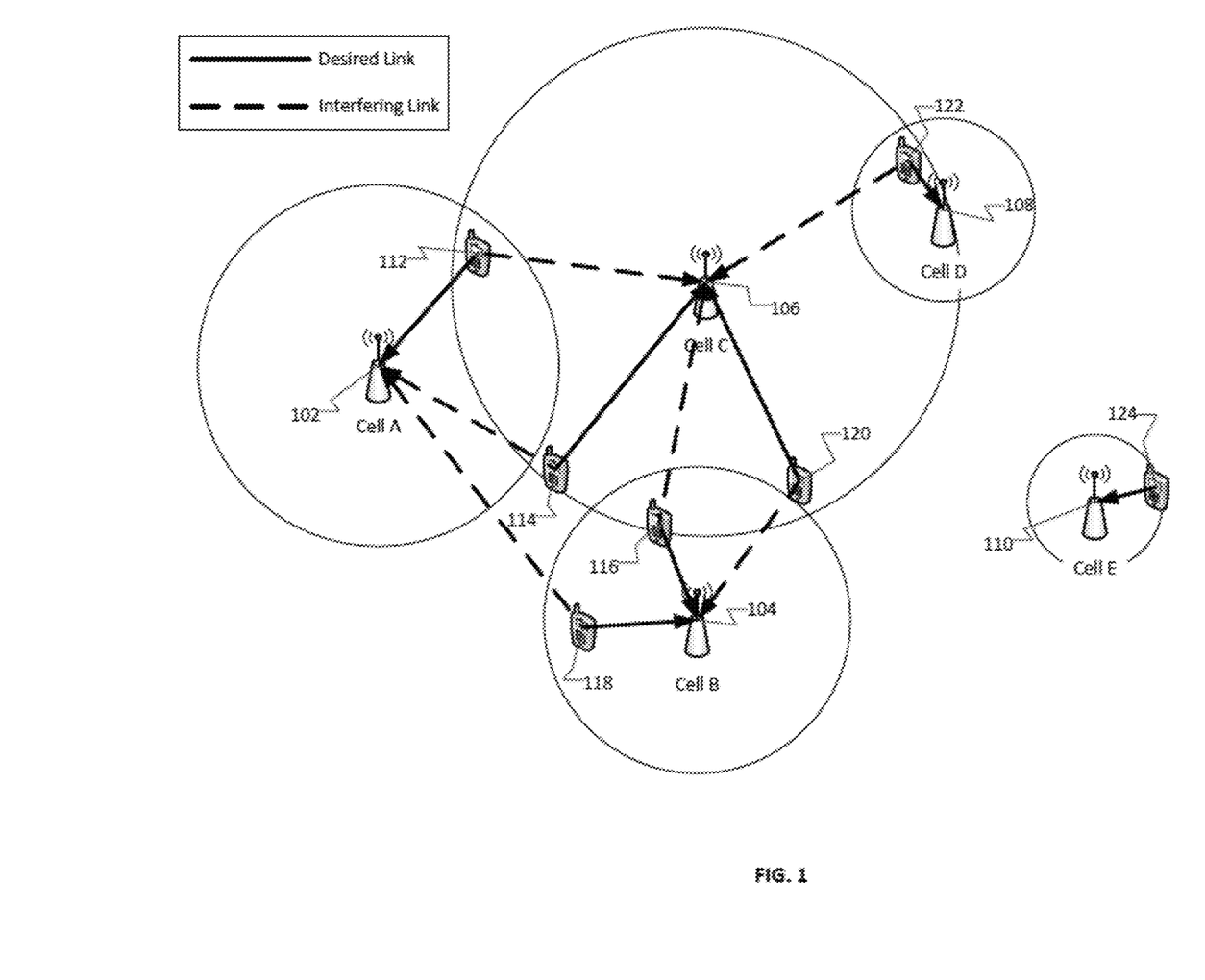
FIG. 1 illustrates an UpLink Interference Management (ULIM) enabled network topology in accordance with some embodiments.

FIG. 1 illustrates an UpLink Interference Management (ULIM) enabled network topology in accordance with some embodiments. In particular, FIG. 1 illustrates an ULIM enabled heterogeneous cellular network with frequency reuse one, in accordance with some embodiments. As shown, the cellular network is comprised of different types of cells sharing the same frequency, which are shown as Cell A 102, Cell B 104, Cell C 106, Cell D 108, and Cell E 110 in FIG. 1. For example, the cells can be macrocells, microcells, picocells, and/or femtocells. At the center of each cell as shown, there is a base station providing cellular service (e.g., voice, data services) over the air to UEs 112, 114, 116, 118, 120, 122, and 124 as shown in FIG. 1.

The cells' coverage areas generally vary and are likely to overlap with one another. The UEs located farther from their serving cells (e.g., and most likely in the overlapping coverage areas) generally transmit at higher power levels. A cell edge UE generally refers to a UE that is located in an overlapping coverage area. As shown in FIG. 1, UEs 112 and 116 are cell edge UEs in this example network topology. Cell edge UEs not only can create a significant amount of inter-cell interference but also typically suffer the most from high inter-cell interference levels. As a result, effective inter-cell interference management is an important cellular technology problem to address in order to enhance the quality of service particularly for UEs in overlapping coverage areas (i.e., the cell edge UEs) and more generally to improve the cellular network performance.

In general, inter-cell interference is not uniform across a heterogeneous cellular network. In some cases, it can be highly dependent on the location of the base stations (e.g., cells) and UEs as well as their respective activity patterns (e.g., activity patterns associated with their respective uplink communication).

In one embodiment, for a given desired cell, the disclosed ULIM techniques include identifying any interfering cells and ranking the interfering cells based on their respective level of interference onto the desired cell (e.g., to determine a set of strongest interfering neighbor cells on a wireless network based on a plurality of measurement reports) as further described below with respect to FIG. 4. In one embodiment, the disclosed ULIM techniques include assigning frequency reuse patterns (e.g., selected from predetermined frequency reuse patterns) to each cell and thus reduce inter-cell interference as further described below with respect to FIGS. 2 and 3. In one embodiment, based on the requirement of the LTE uplink transmission technology (i.e., SC-FDMA), the predetermined frequency reuse patterns are such that the resources allocated to each cell are contiguous.

Accordingly, inter-cell interference can be minimized by avoiding transmission on the same frequency resources by applying the disclosed ULIM techniques. In one embodiment, such avoidance is made possible by defining multiple frequency reuse patterns. Each frequency reuse pattern assigned to a given cell instructs the cell scheduler how to allocate frequency resources to the UEs for concurrent uplink transmissions. As such, with an effective selection of frequency reuse patterns (e.g., from a set of predetermined frequency reuse patterns), the inter-cell interference between cells can be significantly reduced as further described below.

Figure 2:
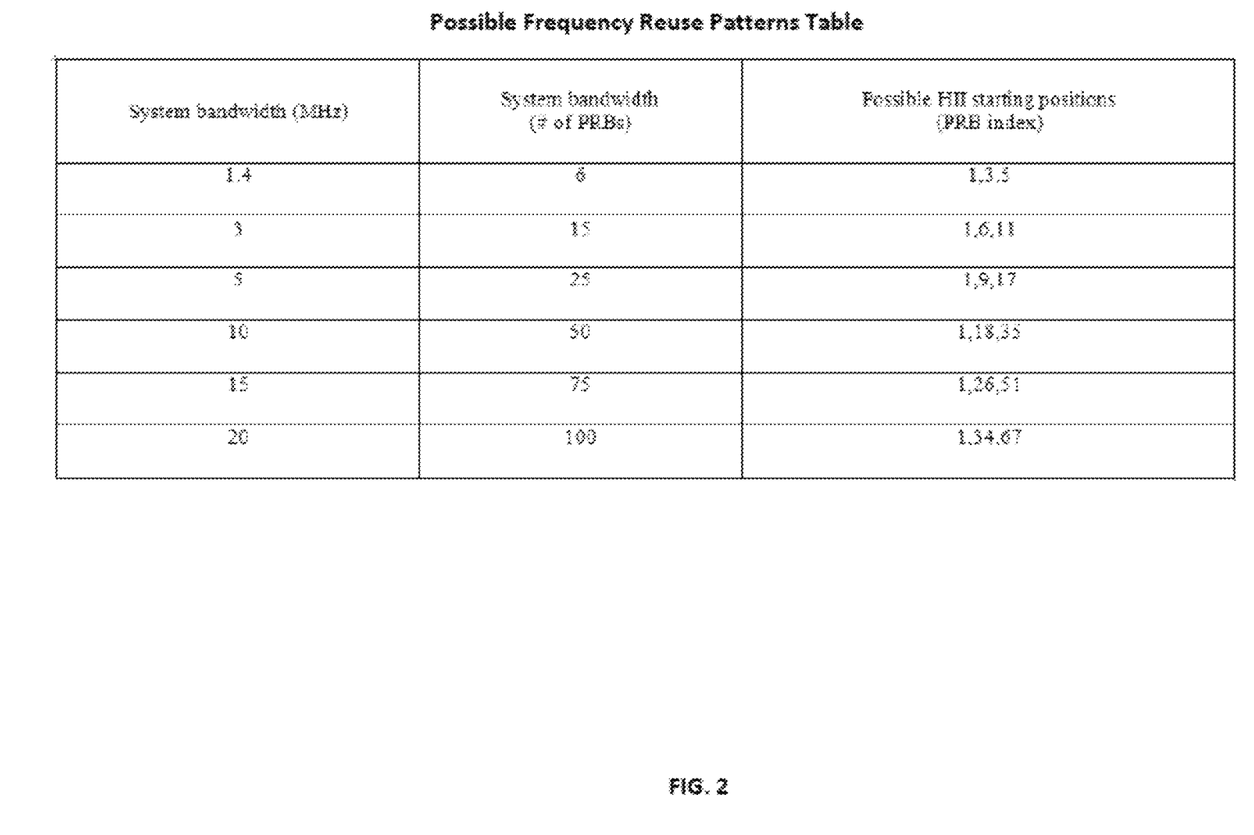
FIG. 2 is a table that illustrates the possible frequency reuse patterns in accordance with some embodiments.

FIG. 2 is a table that illustrates the possible frequency reuse patterns in accordance with some embodiments. In an example implementation, the frequency reuse patterns are provided in the Possible Frequency Reuse Patterns Table of FIG. 2 for different system bandwidths in an LTE system. In this example, three distinct frequency reuse patterns have been defined. In a cell with frequency reuse pattern #1, the scheduler starts assigning frequency resources for uplink transmissions from the first available Physical Resource Block (PRB) (e.g., PRB1) and continues frequency allocation on subsequent Physical Resource Blocks (PRBs) contiguously. With a frequency reuse pattern #2 or #3, the frequency location from which the scheduler assigns resources for uplink transmission depends on the system bandwidth. Based on this particular implementation, with a system bandwidth of 10 MHz and frequency reuse pattern #2, the scheduler assigns frequency resources for uplink transmissions from PRB18 (e.g., or the nearest available PRB with a higher index), onwards.

In one embodiment, ULIM processing includes assigning each cell scheduler to start allocating frequency resources for uplink transmission from a specific position in the spectrum based on an assigned frequency reuse pattern. In an example implementation, ULIM processing does not block any frequency resources, such that (e.g., if required) the scheduler can allocate the entire system bandwidth for multiple concurrent uplink transmissions.

In one embodiment, if ULIM processing assigns the cell to start scheduling from a point other than the beginning of the spectrum (e.g., PRB18 in a 10 MHz system), once the scheduler reaches the end of the spectrum (e.g., PRB50), it may continue assigning frequency resources from the beginning of the system spectrum (e.g., PRB1).

Figure 3:
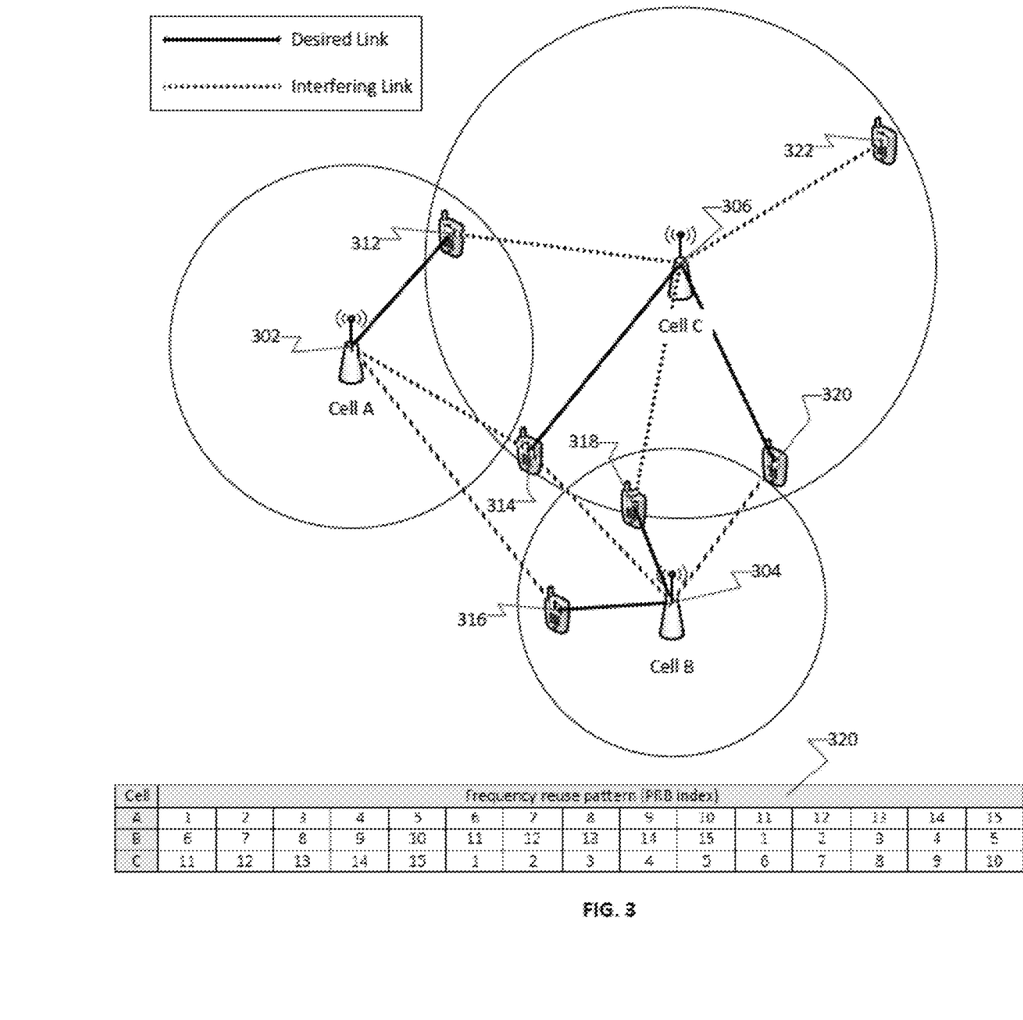
FIG. 3 illustrates a network with three cells with three distinct frequency reuse patterns as shown in a Frequency reuse pattern (PRB Index) table in accordance with some embodiments.

FIG. 3 illustrates a network with three cells with three distinct frequency reuse patterns as shown in a Frequency reuse pattern (PRB Index) table in accordance with some embodiments. In particular, FIG. 3 shows an example network topology of an LTE system with a system bandwidth of 3 MHz, where three neighboring cells have been assigned three different frequency reuse patterns. Cell A 302 is assigned frequency reuse pattern #1, which means the scheduler starts allocating frequency resources from PRB1 and continues allocating resources to (possibly) multiple UEs following the assigned reuse pattern (e.g., as similarly shown in the Possible Frequency Reuse Patterns Table of FIG. 2 for an LTE system bandwidth of 3 MHz). Similarly, Cell B 304 is assigned frequency reuse pattern #2 and hence schedules frequency resources starting from PRB6, and Cell C 306 has been assigned frequency reuse pattern #3 and starts to assign frequency resources from PRB11 (e.g., as similarly shown in the Possible Frequency Reuse Patterns Table of FIG. 2 for an LTE system bandwidth of 3 MHz). With this assignment and assuming one-third spectrum utilization for each cell, there will be no interference between the cells. This is because Cell A 302 is configured to allocate use of PRBs 1-5 to its active UEs for uplink transmission (e.g., shown as a Desired Link in FIG. 3, in which a Desired Link is shown between Cell A 302 and UE 312 as shown in FIG. 3), Cell B 304 is configured to allocate use of PRBs 6-10 to its active UEs for uplink transmission (e.g., in which a Desired Link is shown between Cell B 304 and UEs 316 and 318 as shown in FIG. 3), and Cell C 306 is configured to allocate use of PRBs 11-15 to its active UEs for uplink transmission (e.g., in which a Desired Link is shown between Cell C 306 and UEs 314 and 320 as shown in FIG. 3, and there is no active Desired Link shown with respect to UE 322 in this example). In some cases, such as with a higher load, the cells will use more PRBs, and the inter-cell interference can accordingly increase in such cases.

As will now be apparent, the disclosed techniques for ULIM for wireless networks can be used in various applications to improve wireless network performance and/or facilitate network management in heterogeneous cellular networks by quantifying neighbor cell strengths and allocating distinct frequency reuse patterns to each cell for uplink communication. As will also now be apparent, various other predetermined frequency reuse patterns can be defined for different system bandwidths and/or for different number of distinct frequency reuse patterns (e.g., four, five, or some other number of distinct frequency reuse patterns can similarly be defined for a given LTE system bandwidth).

Identifying A Strongest Set of Neighbor Cells

In one embodiment, the disclosed techniques for ULIM for wireless networks include performing Reference Signal Received Power (RSRP)-assisted Neighbor cell Discovery (RaND) for wireless networks as will now be described. In one embodiment, the disclosed RaND techniques for wireless networks provide tools and methods to identify, quantify, and rank the neighboring cells that can be applied for identifying a strongest set of (N) neighbor cells for a given cell in a wireless network to facilitate uplink interference management in the wireless network as described herein with respect to various embodiments.

In an example implementation, the disclosed RaND techniques for wireless networks can be used to improve wireless network performance and/or facilitate network management in heterogeneous cellular networks by quantifying neighbor cell strengths. For example, the disclosed RaND techniques can enable more informed network configuration and optimization decisions for uplink interference management in heterogeneous cellular networks, such as further described below.

In Long Term Evolution (LTE) technology, Reference Signal Received Power (RSRP) is measured at the UE for the serving and the neighbor cells. This measurement is reported back to the serving cell. Essentially such reports provide general information on the level of desired signal strength (RSRP of the serving cell) and the level of interference (RSRP of the neighbor cells) the UE experiences. More specifically, RSRP measures the average received power over the resource elements that carry cell-specific reference signals across the system bandwidth. In other technologies, equivalent measurements can provide a general picture of level of desired and interfering signals (e.g., RSCP in UMTS or RSSI in Wi-Fi).

In an example implementation of the disclosed RaND techniques, UE RSRP measurement reports (e.g., RSRP measurement reports received at each of the base stations/ cells from its active UEs, respectively) are used to create a quantified Neighbor Relation Table (NRT). Each cell collects the measurement reports of all its active UEs, based on which it assigns strengths to all neighbor cells. For example, the neighbor cells can be ordered and/or ranked in accordance with their respective strengths. In various applications to improve wireless network performance and/or facilitate network management in heterogeneous cellular networks, such ordering/ranking of the neighbor cells can play an important role in the interference management and optimization as will be illustrated with respect to ULIM applications of RaND for wireless networks, such as further described below.

In one embodiment, RaND is performed using the active UEs RSRP measurement reports of neighbor cells. The UE RSRP measurement reports for each neighbor cell are averaged, and the average value for each neighbor cell is stored at the base station (e.g., cell). In this way, the neighbor cells are identified, and, in addition, the average RSRP experienced by all active UEs for each neighbor cell is also available (e.g., stored at each cell, respectively). Henceforth, the strongest neighbor cell as used herein refers to the cell with the highest average RSRP level (e.g., for a predetermined or configured period of time). As such, the disclosed RaND techniques can be deployed in a distributed fashion at each cell independently.

In an example implementation, the strength of each neighbor cell is determined based on the average RSRP level experienced by the active UEs in the cell. This can be implemented by having the UEs report their RSRP measurements along with the Automatic Neighbor Relation (ANR)-related information to the serving cell. Upon receiving a new RSRP report for cell i, cell j updates the average RSRP value for neighbor cell i, as follows:

$$averageRSRP_{ij}(t = n_{ij}) = \left(1 - \frac{1}{n_{ij}}\right) \times averageRSRP_{ij}(t = n_{ij} - 1) + \frac{1}{n_{ij}} \times \frac{1}{M_{ij}(t = n_{ij})} \sum_{m=1}^{M_{ij}(t=n_{ij})} newRSRP_{ijm}(t = n_{ij})$$

where,
$t=n_{ij}$ RSRP reports are received periodically. $t=n_{ij}$ refers to the $n_{ij}$-th period interval after the neighbor relationship between cell l and cell j was established.
$averageRSRP_{ij}$ ($t=n_{ij}$) average RSRP (in linear scale) value stored for neighbor cell i in the NRT of cell j including RSRP measurement received during $t=n_{ij}$.
$M_{ij}(t=n_{ij})$ Number of RSRP measurement reports received at cell j for neighbor cell i during $t=n_{ij}$.
$newRSRP_{ijm}$ m-th new RSRP report for neighbor cell i from a UE in cell j (order of the new RSRP reports and which RSRP report belongs to which UE are not important).

As will now be apparent, a quantifying of neighbor cell strength based on RSRP values for neighbor cells can be performed using various techniques. For example, the average RSRP value can be calculated based on the RSRP measurement reports for the neighbor cell received within a predetermined or configured period of time. As another example, the average RSRP value can be calculated based on a last received or predetermined/configured number of RSRP measurement reports received for the neighbor cell. As yet another example, the average/quantified RSRP value can be calculated based on the received RSRP measurement reports for the neighbor cell using various other calculations, such as a moving average or another calculation based on the received RSRP measurement reports for the neighbor cell to quantify the neighbor relationships using the disclosed RaND techniques.

An exemplary embodiment for RaND for wireless networks for identifying a strongest set of neighbor cells is discussed below with respect to FIG. 4.

Exemplary Embodiments for RaND for Wireless Networks

Figure 4:
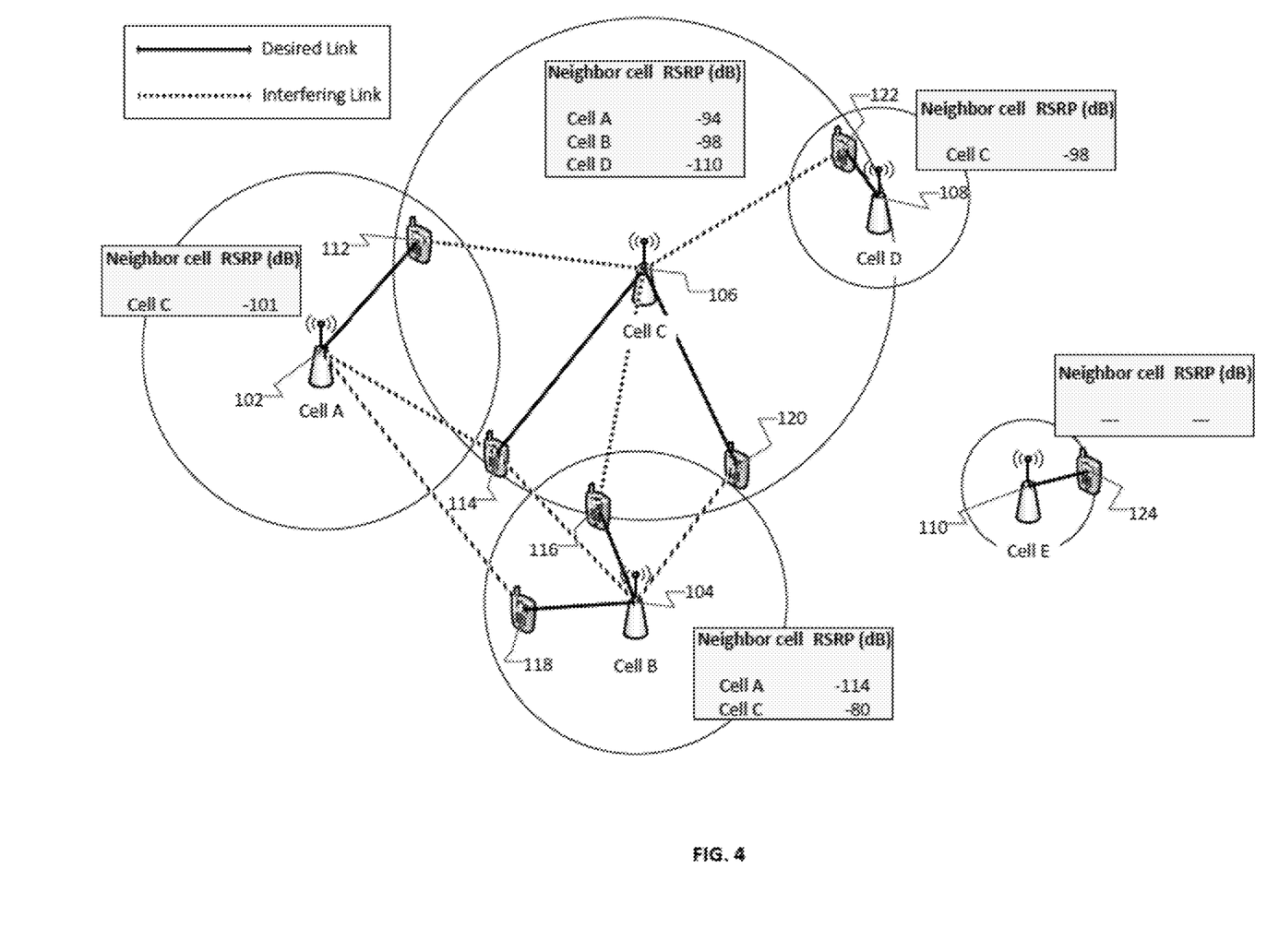
FIG. 4 illustrates a heterogeneous cellular network that implements RSRP-assisted Neighbor cell Discovery (RaND) in accordance with some embodiments.

FIG. 4 illustrates a heterogeneous cellular network that implements RSRP-assisted Neighbor cell Discovery (RaND) in accordance with some embodiments. For each cell, the set of neighbor cells is provided. In one embodiment, the neighbor relationships are quantified using the disclosed RaND techniques.

Referring to FIG. 4, the network topology of the heterogeneous cellular network in this example is the same as shown in FIG. 1. In particular, FIG. 4 shows a heterogeneous cellular network with five cells, including Cell A shown at 102, Cell B shown at 104, Cell C shown at 106, Cell D shown at 108, and Cell E shown at 110. Each of the cells can be macrocells, picocells, microcells, and/or femtocells. At the center of each cell there is a base station providing cellular service (e.g., voice, data, and/or other wireless network communication services) over the air to UEs. Each cell's footprint or coverage area can vary and is likely to overlap with neighboring cells. For each UE, a solid line shows the communication link between the UE and its serving cell as shown in FIG. 4. As also shown in FIG. 4, a dashed line between a UE and an interfering cell illustrates that the UE has reported RSRP measurements for that particular neighboring cell. With the UE RSRP measurements, the disclosed RaND techniques are performed to establish a quantified neighbor relationship between cells as illustrated in FIG. 4.

In some cases, a given cell, such as Cell B as shown in FIG. 4, may see another cell, such as Cell A which does not see Cell B as shown in FIG. 4. In such cases, Cell A would not report any RSRP measurements from Cell B as shown in FIG. 4. Thus, while Cell A is a neighbor of Cell B, the converse would not be true.

In some applications, it is important to maintain a bi-directional neighbor relationship. For example, in some applications, it is important that if Cell A is a neighbor of Cell B, then Cell B should also be a neighbor of Cell A.

Example Components for Performing Uplink Interference Management

Figure 5:
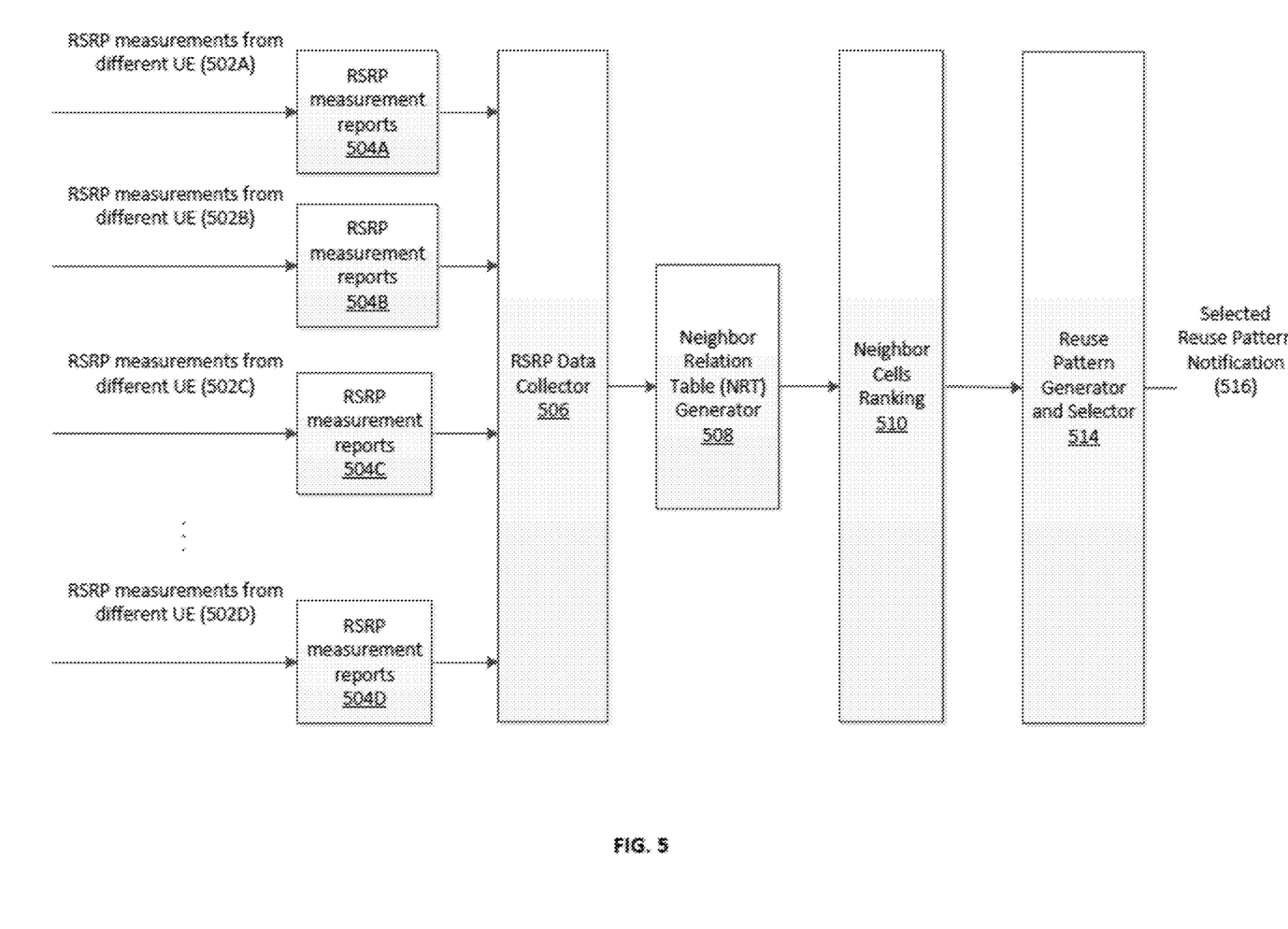
FIG. 5 is a component diagram illustrating a system architecture of a base station for implementing ULIM for wireless networks in accordance with some embodiments.

FIG. 5 is a component diagram illustrating a system architecture of a base station for implementing ULIM for wireless networks in accordance with some embodiments. In one embodiment, the disclosed techniques can be implemented in a base station (e.g., a cell of an eNodeB (eNB)) using the system and components to perform the disclosed techniques for ULIM for wireless networks, such as described above with respect to FIGS. 1-4.

Referring to FIG. 5, RSRP measurement reports 504A-D are collected from different UEs (e.g., mobile phones) as shown at 502A-D (e.g., in which each of the UEs are active UEs for the cell). As shown, an RSRP data collector component 506 collects the RSRP measurement reports (e.g., the collected RSRP measurement reports can be cached/stored locally for processing using the disclosed RaND techniques). A neighbor relation table (NRT) generator component 508 processes the collected RSRP measurement reports to generate a quantified NRT as similarly described above (e.g., the NRT can be cached/stored locally for processing using the disclosed RaND techniques). A neighbor cell ranking component 510 processes the NRT to generate an order/ranking of the neighbor cells based on the assigned strengths of each of the neighbor cells as similarly described above.

Referring to FIG. 5, the strength order/ranking of the neighbor cells is provided to a reuse pattern generator and selector component 514. In one embodiment, reuse pattern generator and selector component 514 utilizes a predetermined set of frequency reuse patterns as similarly described herein. In one embodiment, reuse pattern generator and selector component 514 processes the strength order/ranking of the neighbor cells to identify the strongest Y−1 neighbor cells (e.g., its strongest Y−1 neighbor cells). For example, reuse pattern generator and selector component 514 can determine whether there is a reuse pattern conflict with the identified neighbors (e.g., strongest Y−1 neighbor cells). If so (e.g., a reuse pattern conflict with one or more of the identified neighbors was determined), then reuse pattern generator and selector component 514 can select/determine a reuse pattern to avoid a conflict (if possible) with the identified neighbors (e.g., strongest Y−1 neighbor cells). At 516, the cell notifies all of its neighbors of the frequency reuse pattern selection (e.g., the reuse pattern change based on the ULIM selected/determined reuse pattern to avoid interference (if possible) with the strongest Y−1 neighbor cells).

In an example implementation, the components of a system that includes and executes the above-described components as described above with respect to FIG. 5 can be implemented in software executed on a processor (e.g., implemented using the C programming language and/or other programming/scripting languages) and/or implemented using customizable/programmable hardware (e.g., an ASIC, FPGA, and/or other programmable hardware).

In an example implementation of a system architecture, the disclosed techniques are implemented in a distributed fashion (e.g., a distributed architecture), in which each cell can identify its strongest neighbors, and then communicate its frequency patterns with each of its Y−1 strongest neighbors as further described below (e.g., as an agent or other component on each cell, which can include femtocells, picocells, microcells, and macrocells). In another example implementation of a system architecture, the disclosed techniques are implemented using a centralized/SON architecture and/or hybrid architecture as also further described below (e.g., distributed and centralized/SON for some of the processing operations).

Example Processes for Performing Uplink Interference Management

Figure 6:
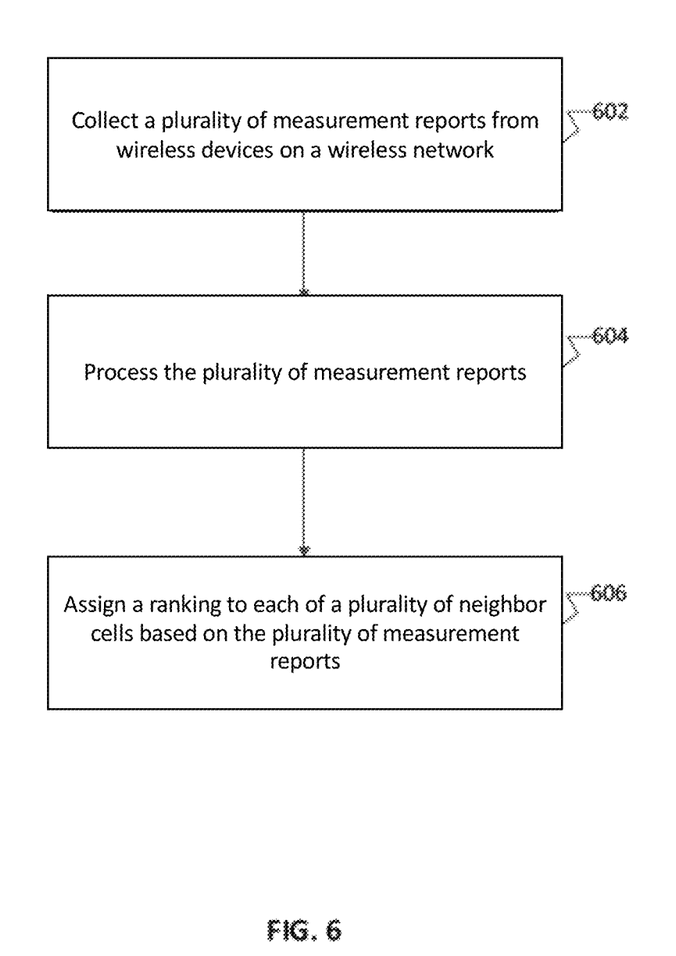
FIG. 6 is a flow diagram illustrating a process for performing RaND for wireless networks in accordance with some embodiments.

FIG. 6 is a flow diagram illustrating a process for performing RaND for wireless networks in accordance with some embodiments. In one embodiment, the process for implementing RaND for wireless networks can be implemented using the system and components as described above with respect to FIG. 5.

Referring to FIG. 6, at 602, collecting a plurality of measurement reports from wireless devices on a wireless network is performed. For example, RSRP measurement reports can be collected from wireless devices (e.g., UEs, such as mobile phones) as similarly described above with respect to FIGS. 4 and 5.

At 604, processing the plurality of measurement reports is performed. For example, the RSRP measurement reports can be processed as described above with respect to FIGS. 4 and 5.

In one embodiment, processing the plurality of measurement reports includes quantifying neighbor relationships based on the RSRP measurement reports collected/received from UEs (e.g., active UEs for a given cell). For example, the RSRP measurement reports can be processed to determine a measure of neighbor cell strength using the disclosed RaND techniques. In an example implementation, the processing of the plurality of measurement reports can include generating a quantified Neighbor Relation Table (NRT), such as similarly described above.

At 606, assigning a ranking to each of the neighbor cells based on the measurement reports is performed. For example, an order or ranking of neighbor cells can be generated based on the RSRP measurement reports as described above with respect to FIGS. 4 and 5.

In one embodiment, an order or ranking of neighbor cell strengths based on the RSRP measurements from UEs can be determined based on a calculated average and/or another quantification of the RSRP measurements collected/received from the UEs for each of the cells using the disclosed RaND techniques.

In one embodiment, the quantified neighbor relationships can be applied to select a subset of neighbor cells based on the order/ranking of neighbor cell strengths. For example, in uplink interference management related applications such as described above with respect to FIGS. 1-5, the cell can be configured to select the strongest neighbors as a subset of its neighbor cells to select for the purpose of reducing inter-cell interference levels. As another example, if the cell can only attempt to reduce interference with n number of its neighbor cells and the cell has greater than n number of its neighbor cells, then the above-described RaND techniques can be used to select the strongest n neighbors.

Figure 7:
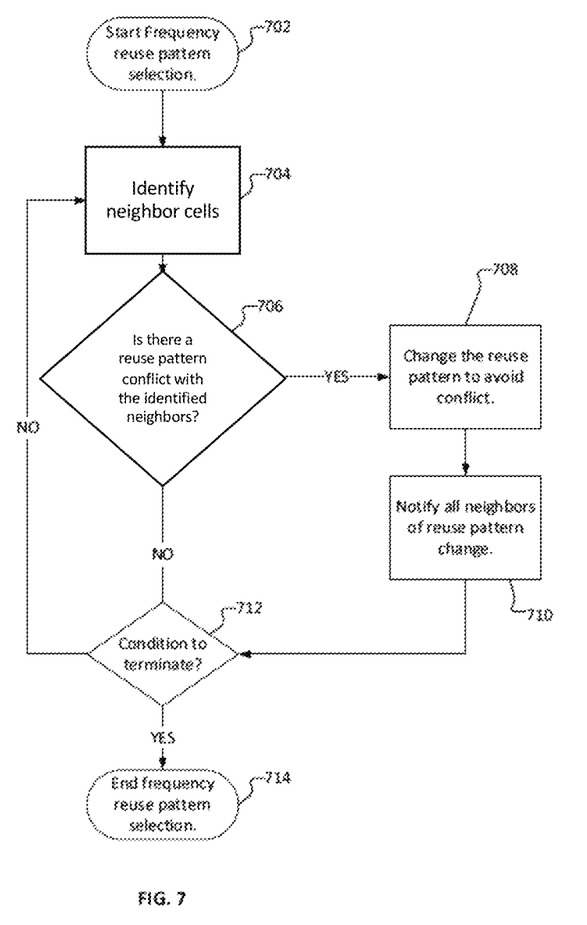
FIG. 7 is a flow diagram that illustrates an uplink frequency reuse pattern assignment process in accordance with some embodiments.

FIG. 7 is a flow diagram that illustrates an uplink frequency reuse pattern assignment process in accordance with some embodiments. In one embodiment, the process for implementing ULIM for wireless networks can be implemented using the system and components as described above with respect to FIG. 5.

In particular, FIG. 7 illustrates a frequency reuse pattern selection process in accordance with some embodiments. In an example implementation, based on the patterns defined in FIG. 1, each cell selects a frequency reuse pattern to avoid conflict/collision with its respective strongest two neighbor cells. In general, however, Y>3 frequency reuse patterns may be defined, where accordingly each cell selects a pattern to avoid conflicts with Y−1 strongest neighbors.

Referring to FIG. 7, the process starts a frequency reuse pattern selection at 702 (e.g., each cell in the wireless network can perform the process shown in FIG. 4). At 704, a cell identifies its neighbor cells based on an assigned ranking (e.g., a ranking of Y−1 neighbor cells that have the strongest RSRP measurements). At 706, whether there is a reuse pattern conflict with the identified neighbors is determined. If so (e.g., yes, a reuse pattern conflict with one or more of the identified neighbors was determined), then change the reuse pattern to avoid conflict is performed at 708. It should be noted that since Y frequency patterns are defined, there always exists one frequency reuse pattern to avoid conflict with the strongest (Y−1) neighbors. At 710, the cell notifies all of its neighbors of the reuse pattern change. Otherwise (e.g., no, a reuse pattern conflict with the identified neighbors was not determined), processing continues to stage 712. At 712, a condition to terminate the algorithm is tested. In some embodiments, the algorithm may execute stages 704-710 for a predetermined number of times. In other embodiments, the frequency reuse pattern can be periodically checked and optimized with no terminating condition. If the condition at 712 is not met, then processing returns to 704. Otherwise (e.g., the algorithm counter has reached the maximum), the processing is completed to end the frequency reuse pattern selection at 714.

In one embodiment, each cell can decide on the frequency reuse pattern in a distributed fashion with minimal communication between the cell and its neighbor cells. In this embodiment, no central entity is required to perform the process described in FIG. 7.

In one embodiment, a distributed agent (e.g., an agent deployed/installed on each cell in a distributed architecture for performing the disclosed ULIM techniques) may be used to facilitate performing the process described in FIG. 7. In an example implementation, the agent identifies the strongest neighbor cells and calculates frequency reuse patterns (e.g., which can include the disclosed ULIM processing techniques, such as identifying the strongest (Y−1) neighbor cells, generating predetermined frequency reuse patterns, and/or calculating frequency reuse patterns, such as according to the processes described in FIGS. 6 and 7 and further described herein), and communicates the corresponding frequency reuse pattern to the agents of the other cells.

In one embodiment, a central entity (e.g., a central server, such as a SON server in a centralized architecture for performing the disclosed ULIM techniques) may be used to facilitate performing the process described in FIG. 7. In an example implementation, the central entity identifies the strongest neighbor cells and calculates frequency reuse patterns (e.g., which can include the disclosed ULIM processing techniques, such as identifying the strongest (Y−1) neighbor cells, generating predetermined frequency reuse patterns, and/or calculating frequency reuse patterns, such as according to the processes described in FIGS. 6 and 7 and further described herein), and communicates the corresponding frequency reuse pattern down to the cells.

In one embodiment, a hybrid architecture may be used to facilitate performing the process described in FIG. 7. For example, some aspects of the disclosed ULIM processing techniques (e.g., identifying the strongest (Y−1) neighbor cells, generating predetermined frequency reuse patterns, and/or calculating frequency reuse patterns, such as according to the process described in FIGS. 6 and 7 and further described herein) can be performed using a central entity and other aspects of the disclosed ULIM processing techniques (e.g., identifying the strongest (Y−1) neighbor cells, generating predetermined frequency reuse patterns, and/or calculating frequency reuse patterns, such as according to the process described in FIGS. 6 and 7 and further described herein) can be performed using distributed agents (e.g., agents installed/deployed on each of the cells in the wireless network).

Figure 8:
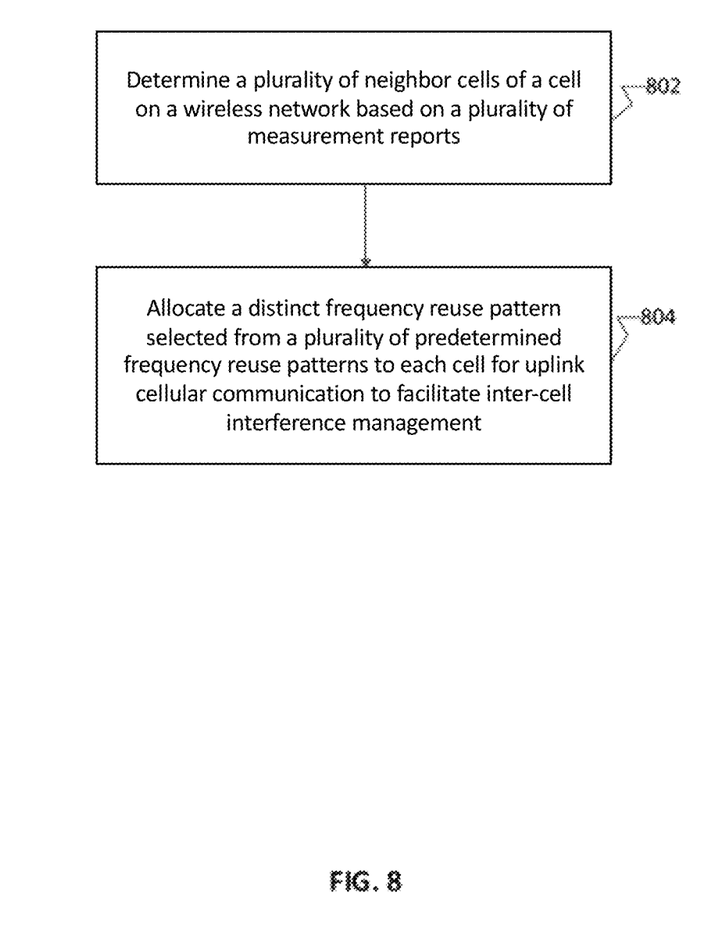
FIG. 8 is a flow diagram illustrating a process for performing ULIM for wireless networks for wireless networks in accordance with some embodiments.

FIG. 8 is a flow diagram illustrating a process for performing ULIM for wireless networks for wireless networks in accordance with some embodiments. In one embodiment, the process for implementing ULIM for wireless networks for wireless networks can be implemented using the system and components as described above with respect to FIG. 5.

Referring to FIG. 8, at 802, determining a plurality of neighbor cells of a cell on a wireless network based on a plurality of measurement reports is performed. For example, a set of strongest neighbor cells of a cell on a wireless network based on a plurality of measurement reports can be performed as similarly described above with respect to FIG. 6.

At 804, allocating a distinct frequency reuse pattern selected from a plurality of predetermined frequency reuse patterns to each cell for uplink cellular communication is performed to reduce uplink inter-cell interference levels. For example, a distinct frequency reuse pattern selected from a plurality of predetermined frequency reuse patterns to each cell can be performed as similarly described above with respect to FIGS. 1-3.

Figure 9:
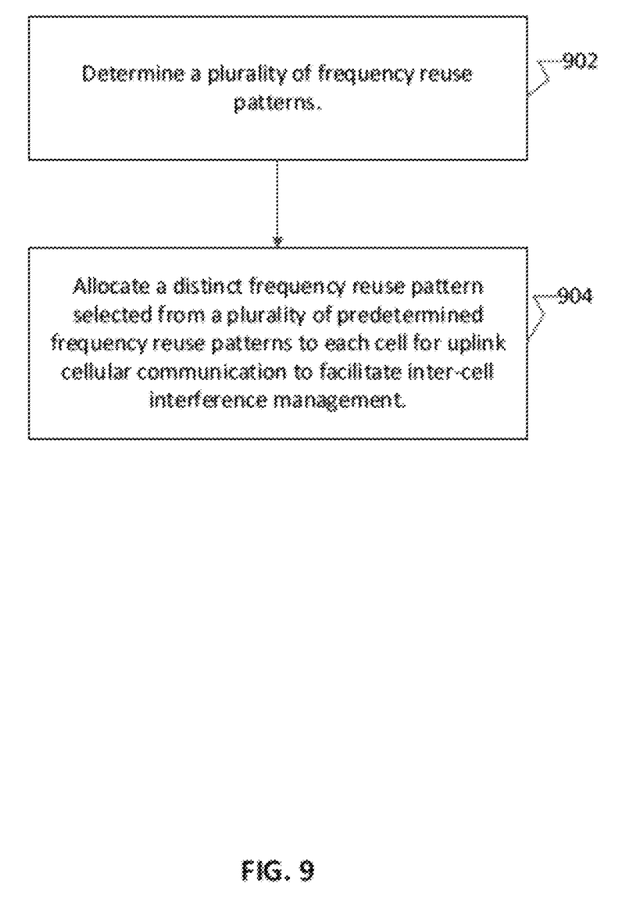
FIG. 9 is another flow diagram illustrating a process for performing ULIM for wireless networks for wireless networks in accordance with some embodiments.

FIG. 9 is another flow diagram illustrating a process for performing ULIM for wireless networks for wireless networks in accordance with some embodiments. In one embodiment, the process for implementing ULIM for wireless networks for wireless networks can be implemented using the system and components as described above with respect to FIG. 5.

Referring to FIG. 9, at 902, determining a plurality of frequency reuse patterns is performed. For example, determining a plurality of frequency reuse patterns (e.g., to define/generate a set of predetermined frequency reuse patterns) can be performed as similarly described above with respect to FIGS. 1-3.

At 904, allocating a distinct frequency reuse pattern selected from a plurality of predetermined frequency reuse patterns to each cell for uplink cellular communication is performed to facilitate inter-cell interference management. For example, a distinct frequency reuse pattern selected from a plurality of predetermined frequency reuse patterns to each cell for uplink cellular communication can be performed as similarly described above with respect to FIGS. 1-3.

More generally, the various principles described herein provide techniques for distributed interference management that may be independently performed within each cell of a wireless network. These techniques are unique and distinct from well-understood, routine, and/or conventional solutions that rely on centralized interference management entities of a wireless network.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A cellular network apparatus, comprising:
a transmitter configured to transmit Orthogonal Frequency Division Multiple Access (OFDMA) signals;
a receiver configured to receive Single-Carrier Frequency Division Multiple Access (SC-FDMA) signaling;
a processor; and
a non-transitory computer readable medium comprising one or more instructions which when executed by the processor, causes the cellular network apparatus to:
set a contiguous frequency resource allocation for the receiver from a first number of predetermined frequency reuse patterns based on a ranked plurality of neighboring cells having a second number of interfering neighboring cells; and
communicate the contiguous frequency resource allocation to a plurality of user equipment.

2. The cellular network apparatus of claim 1, wherein the ranked plurality of neighboring cells are ranked based on Reference Signal Received Power (RSRP) measurements reported from the plurality of user equipment.

3. The cellular network apparatus of claim 1, wherein the ranked plurality of neighboring cells are obtained from a centralized server.

4. The cellular network apparatus of claim 3, wherein the first number of predetermined frequency reuse patterns are obtained from the centralized server.

5. The cellular network apparatus of claim 4, wherein the first number of predetermined frequency reuse patterns are communicated to at least one other cell of the ranked plurality of neighboring cells.

6. The cellular network apparatus of claim 1, wherein the ranked plurality of neighboring cells are determined based on communication with at least one other cell of a cellular network.

7. The cellular network apparatus of claim 1, further configured to monitor for a subsequent resource conflict and responsively adjust the contiguous frequency resource allocation for the receiver.

8. The cellular network apparatus of claim 1, wherein the contiguous frequency resource allocation for the receiver comprises sequentially numbered Physical Resource Blocks (PRBs).

9. A cellular network server, comprising:
a processor in communication with at least one cell station; and
a non-transitory computer readable medium comprising one or more instructions which when executed by the processor, causes the cellular network server to:
rank a first number of interfering neighboring cells from a plurality of neighboring cells based on downlink signaling;
generate a second number of contiguous frequency reuse patterns for uplink signaling; and
provide the second number of contiguous frequency reuse patterns to the plurality of neighboring cells.

10. The cellular network server of claim 9, wherein the cellular network server is configured to manage a heterogenous cellular network characterized by non-uniform inter-cell interference.

11. The cellular network server of claim 9, wherein the cellular network server is configured to manage a heterogenous cellular network characterized by unknown cell deployments.

12. The cellular network server of claim 9, wherein the downlink signaling and the uplink signaling are characterized by different Peak to Average Power Ratios (PAPRs).

13. The cellular network server of claim 9, wherein the downlink signaling is characterized by discontinuous resource allocations and the uplink signaling is characterized by continuous resource allocations.

14. A method of performing uplink interference management, comprising:
collecting a plurality of downlink signal quality measurements from a corresponding plurality of user equipment;
identifying a plurality of neighboring cells based on the plurality of downlink signal quality measurements;
ranking a first number of interfering neighboring cells from the plurality of neighboring cells based on the plurality of downlink signal quality measurements;
generating a second number of contiguous frequency reuse patterns for uplink signaling; and
providing the second number of contiguous frequency reuse patterns to the plurality of neighboring cells, wherein the plurality of neighboring cells are configured to assign at least one contiguous frequency resource selected from the second number of contiguous frequency reuse patterns to the corresponding plurality of user equipment.

15. The method of claim 14, wherein the plurality of downlink signal quality measurements comprise Reference Signal Received Power (RSRP) measured on an Orthogonal Frequency Division Multiple Access (OFDMA) signal.

16. The method of claim 15, wherein the second number of contiguous frequency reuse patterns enable Single-Carrier Frequency Division Multiple Access (SC-FDMA) signaling.

17. The method of claim 14, further comprising monitoring for a subsequent resource conflict and responsively adjusting the at least one contiguous frequency resource.

18. The method of claim 14, wherein the plurality of neighboring cells are characterized by non-uniform inter-cell interference.

19. The method of claim 14, wherein the plurality of neighboring cells are characterized by unknown cell deployments.

20. The method of claim 14, wherein the plurality of downlink signal quality measurements and the uplink signaling are characterized by different Peak to Average Power Ratios (PAPRs).

21. The method of claim 14, wherein the plurality of downlink signal quality measurements describe discontinuous resource allocations.

\* \* \* \* \*